US012263566B1

(12) United States Patent
Johnson

(10) Patent No.: US 12,263,566 B1
(45) Date of Patent: Apr. 1, 2025

(54) DISCONNECTING SYSTEM AND METHOD FOR ENHANCED STRENGTH FLUID COUPLINGS

(71) Applicant: Carl B. Johnson, Campbellsburg, IN (US)

(72) Inventor: Carl B. Johnson, Campbellsburg, IN (US)

( * ) Notice: Subject to any disclaimer, the term of this patent is extended or adjusted under 35 U.S.C. 154(b) by 0 days.

(21) Appl. No.: 18/609,040

(22) Filed: Mar. 19, 2024

(51) Int. Cl.
*B25B 27/00* (2006.01)
*B25B 27/02* (2006.01)

(52) U.S. Cl.
CPC .................................... *B25B 27/02* (2013.01)

(58) Field of Classification Search
CPC ......... B25B 25/00; B25B 27/00; B25B 27/14; B25B 27/0028
See application file for complete search history.

(56) References Cited

U.S. PATENT DOCUMENTS 463,131 A * 11/1891 Allen ........................ B67B 7/18 81/3.4
2,221,056 A * 11/1940 Mason .................... A47J 45/10 81/3.4
4,067,279 A * 1/1978 Lester ....................... B67B 3/14 81/3.4
7,168,337 B2 * 1/2007 Carmo ...................... B67B 7/18 81/3.43
8,991,057 B2 * 3/2015 Jaynes ...................... B67B 7/30 81/3.4
9,242,841 B1 * 1/2016 Appleby ................. B67B 7/184
D799,925 S * 10/2017 Wheeler .......................... D8/33
D863,003 S * 10/2019 Sahli ................................ D8/19
2004/0261580 A1 * 12/2004 Carmo ...................... B67B 7/18 81/3.43
2008/0314205 A1 12/2008 Feliciano
2011/0088516 A1 * 4/2011 Nakanishi ................. B67B 7/44 81/3.4

(Continued)

FOREIGN PATENT DOCUMENTS

CN 113677482 A 11/2021
WO 2020088372 A1 5/2020

OTHER PUBLICATIONS

SharkBite SBDC35 De-Mount Clip, 1-¼-Inch , Orange, Amazon, Mar. 29, 2024, Online available at: https://www.amazon.com/SharkBite-SBDC35-Mount-Clip-4-Inch/dp/B008R6W40S/ref=sr_1_25?gclid=EAIaIQobChMI1snejaq2_AIV-8mUCR0AxgW8EAMYASAAEgJrJvD_BwE&hvadid=493943891437&hvdev=c&hvlocphy=1017003&hvnetw=g&hvqmt=b&hvrand=6419932329462785568&hvtargid=kwd-358232068309&hydadcr=25747_9903383&keywords=sharkbite%2Bfitting%2Bremoval%2Btool&qid=1673124412&sr=8-25&th=1.

(Continued)

*Primary Examiner* — Lee D Wilson
(74) *Attorney, Agent, or Firm* — Brannon Sowers & Cracraft PC; Myron A. Adams

(57) ABSTRACT

A disconnecting system for fluid couplings includes a first deformable clip having a ramp surface extending helically around an axis, and a second deformable clip including a drive surface shaped for facing contact against the ramp surface. The first clip and the second clip can be engaged upon coupled fluid conduits, such as fluid conduits connected by way of an enhanced strength fitting, and rotated relative to one another to bear a drive surface of the second clip against a ramp surface of the first clip whilst one of the fluid conduits is gripped by an inside gripping surface of the second clip, thereby reversing the enhanced strength fit connection between the fluid conduits.

19 Claims, 4 Drawing Sheets

(56) References Cited

U.S. PATENT DOCUMENTS

2022/0266430 A1 8/2022 Warren

OTHER PUBLICATIONS

Hotop 5 Pieces Disconnect Clips Fitting Slip Removal Tools Push-fit Disconnect Tools for Easily Removing Push-fit Fitting, 5 Sizes (14 Inch, 38 Inch, 12 Inch, 34 Inch and 1 Inch), Amazon, Mar. 29, 2024, Online available at: https://www.amazon.com/Disconnect-Fitting-Removal-Push-fit-Removing/dp/B08XWCFRT3/ref=sr_1_13?gclid=EAlalQobChMI1snejaq2_AIV-8mUCR0AxgW8EAMYASAAEgJrJvD_BwE&hvadid=493943891437&hvdev=c&hvlocphy=1017003&hvnetw=g&hvqmt=b&hvrand=6419932329462785568&hvtargid=kwd-358232068309&hydadcr=2574.

SharkBite ½, ¾, 1 Inch PVC Disconnect Clip Set for Push to Connect Brass Plumbing Fittings, PVC IPS (Iron Pipe Size), UIP716A, Amazon, Mar. 29, 2024, Online available at: https://www.amazon.com/SharkBite-Fitting-UIP716A-3-Pack-Disconnect/dp/B01EHUL430/ref=sr_1_8?gclid=EAlalQobChMI1snejaq2_AIV-8mUCR0AxgW8EAMYASAAEgJrJvD_BwE&hvadid=493943891437&hvdev=c&hvlocphy=1017003&hvnetw=g&hvqmt=b&hvrand=6419932329462785568&hvtargid=kwd-358232068309&hydadcr=2574.

Hover over image to zoom OEMTOOLS ⅜in—¾in Internal Pipe Extractor 3 Piece, Autozone, Mar. 29, 2024, Online available at: https://www.autozone.com/nuts-bolts-and-washers/pipe-extractor/p/oemtools-3-8in-3-4in-internal-pipe-extractor-3-piece/52435_0_0.

ABN Internal Pipe Removal Tool Pipe Nipple Extractor Set, General Internal Pipe Wrench Set 4pc—1, ¾, ½, ⅜Inch, Amazon, Mar. 29, 2024, Online available at: https://www.amazon.com/ABN-Internal-Removal-Extractor-General/dp/B081FJX71W.

Got2Learn, Jun. 16, 2019, "6 ways to remove Sharkbite fittings." YouTube video, Online available at: https://www.youtube.com/watch?v=nBS6Mel_500.

* cited by examiner

DISCONNECTING SYSTEM AND METHOD FOR ENHANCED STRENGTH FLUID COUPLINGS

TECHNICAL FIELD

The present disclosure relates generally to a disconnecting system for a fluid coupling, and more particularly to a deformable clip including a ramp surface structured for engagement by a drive surface on a second deformable clip to disengage an enhanced strength fluid coupling via relative rotation between the respective deformable clips.

BACKGROUND

Fluid connections amongst fluid conduits are used in virtually innumerable applications around the world. Traditional strategies for connecting fluid conduits, such as in a residential or industrial plumbing environment, can include various soldering strategies, clamping strategies, and the use of various seals. Establishing such fluid connections, not to mention reversing such fluid connections, can be a labor intensive process.

In recent years, various engineering efforts have been directed at facilitating the reliable connection of fluid conduits during construction or remodeling projects. One strategy, known commercially under the trade name Sharkbite® employs spurs, points, or the like upon a fitting that can "bite" into material of a fluid conduit to quickly and reliably establish a connection that is difficult to reverse. In a typical example, a user can push a fluid conduit equipped with such a fitting into a receiving fluid conduit, housing, fitting, et cetera, with the force of the pushing causing the desired engagement. As such, an enhanced strength connection can be established. Disassembly of such connections is desirably relatively difficult, and various tools in the plumbing trade have been proposed for such purposes. One known example employs a specialized gripping device that enables a user to reverse such connections. Tools of this general type tend to be highly specialized and expensive, however. The present disclosure is directed to one or more of the problems or shortcomings known in the art.

SUMMARY OF THE INVENTION

In one aspect, a disconnecting system for fluid couplings includes a first deformable clip having a first finger tab, a second finger tab, an outer surface, an arcuate inside gripping surface extending around an axis between the first finger tab and the second finger tab, an axial end surface facing a first axial direction, and a ramp surface opposite to the axial end surface. The ramp surface advances in a second axial direction and in a circumferential direction around the axis between the first finger tab and the second finger tab. The disconnecting system further includes a second deformable clip including a second inside gripping surface, and a drive surface shaped for facing contact against the ramp surface in a coaxial service arrangement of the first deformable clip and the second deformable clip.

In another aspect, a deformable clip for a disconnecting system for fluid couplings includes a clip body having a first finger tab, a second finger tab, an outer surface, an arcuate inside gripping surface extending around an axis between the first finger tab and the second finger tab, an axial end surface facing a first axial direction, and a ramp surface. The ramp surface is oriented at a ramp angle to the axis, and defines a circumferential angle around the axis that is greater than 180 degrees and less than 360 degrees.

In still another aspect, a method of disconnecting a fluid coupling includes positioning a first clip adjacent to a first fluid conduit connected to a second fluid conduit, and deforming a second clip to grip the second fluid conduit with an inside gripping surface of the second clip. The method further includes rotating the second clip relative to the first clip to bear a ramp surface of the first clip against the second clip. The method still further includes translating the inside gripping surface of the second clip relative to the first clip based on the bearing the ramp surface of the first clip against the second clip, and withdrawing the second fluid conduit from the first fluid conduit based on the translating the inside gripping surface of the second clip relative to the first clip.

DETAILED DESCRIPTION

Figure 1:
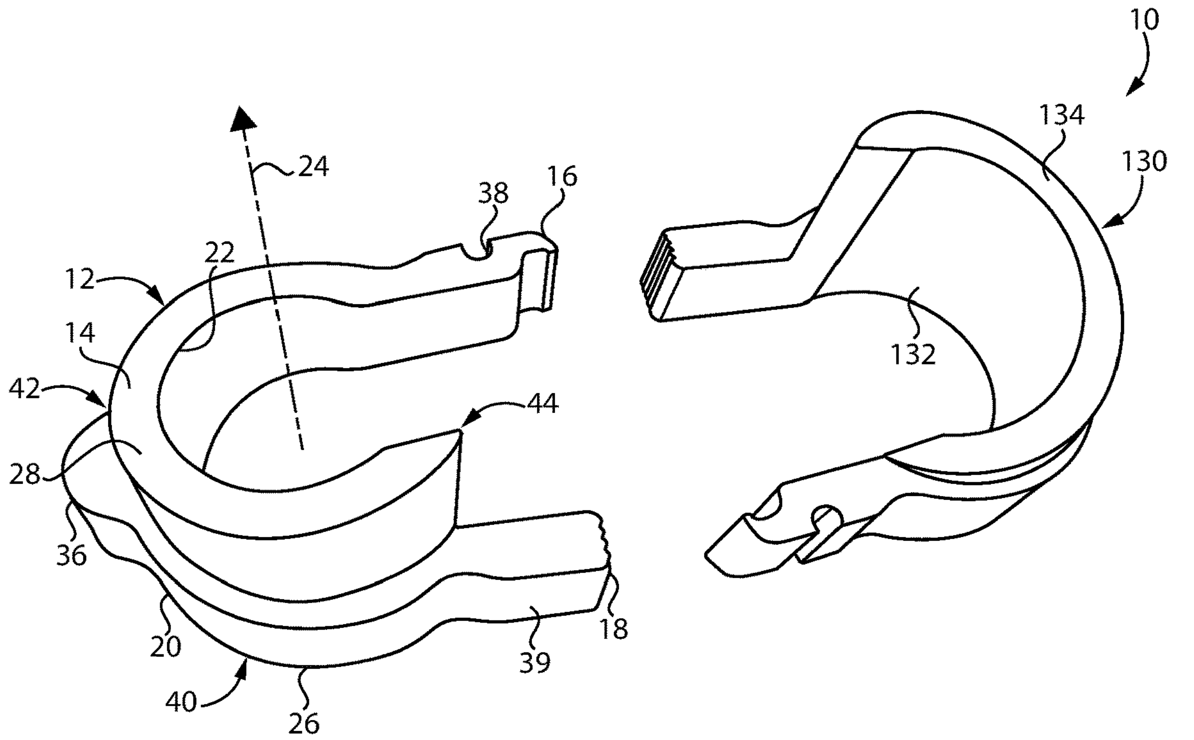
FIG. 1 is a perspective view of a disconnecting system for fluid couplings, according to one embodiment.

Referring to FIGS. 1-5, but with initial focus on FIG. 1, there is shown a disconnecting system 10 for fluid couplings, according to one embodiment. System 10 includes a first deformable clip 12 having a one-piece clip body 14. Clip body 14 may include a molded body formed, for example, of a non-metallic material such as a suitable plastic. Clip body 14 could also be formed by additive manufacturing, machining, or any of a variety of other processes. System 10 also includes a second deformable clip 130. Second deformable clip 130 may, in certain embodiments, be identical to first deformable clip 12. Accordingly, description and discussion herein of features or functions of first deformable clip 12 should be understood to refer by way of analogy to second deformable clip 130 except where otherwise indicated or apparent from the context.

First deformable clip 12 and clip body 14, referred to generally interchangeably herein, includes a first finger tab 16, a second finger tab 18, an outer surface 20, and an arcuate inside gripping surface 22. Gripping surface 22 extends around an axis 24 between first finger tab 16 and second finger tab 18. First deformable clip 12 further includes an axial end surface 26 facing a first axial direction, approximately into the page in the illustration of FIG. 1, and a ramp surface 28 opposite to axial end surface 26. Ramp surface 28 advances in a second axial direction opposite to the first axial direction, and advances in a circumferential direction around axis 24 between first finger tab 16 and second finger tab 18. Second deformable clip 130 includes a second inside gripping surface 132, and a drive surface 134 shaped for facing contact against ramp surface 28 in a coaxial service arrangement of first deformable clip 12 and second deformable clip 130 as further discussed herein.

In the illustrated embodiment, ramp surface 28 is helical, and each of ramp surface 28 and drive surface 134 may be continuously helical in some embodiments. It should be appreciated that the term "helical" as contemplated herein does not mean necessarily a precise helix shape, but more generally traversing a generally helical path around and along axis 24. As will be further apparent from the following description, alternative shapes to helical respecting one or both of ramp surface 28 and drive surface 134 are within the scope of the present disclosure.

As also noted above, first deformable clip 12 and second deformable clip 130 may be substantially identical. Alternatives are nevertheless contemplated wherein second deformable clip includes a drive surface that is not helical, but instead is generally projecting in an axial direction and allows second deformable clip 130 to be driven in an axial direction when second deformable clip 130 is rotated relative to first deformable clip 12 in contact with ramp surface 28 in a coaxial service arrangement.

Figure 2:
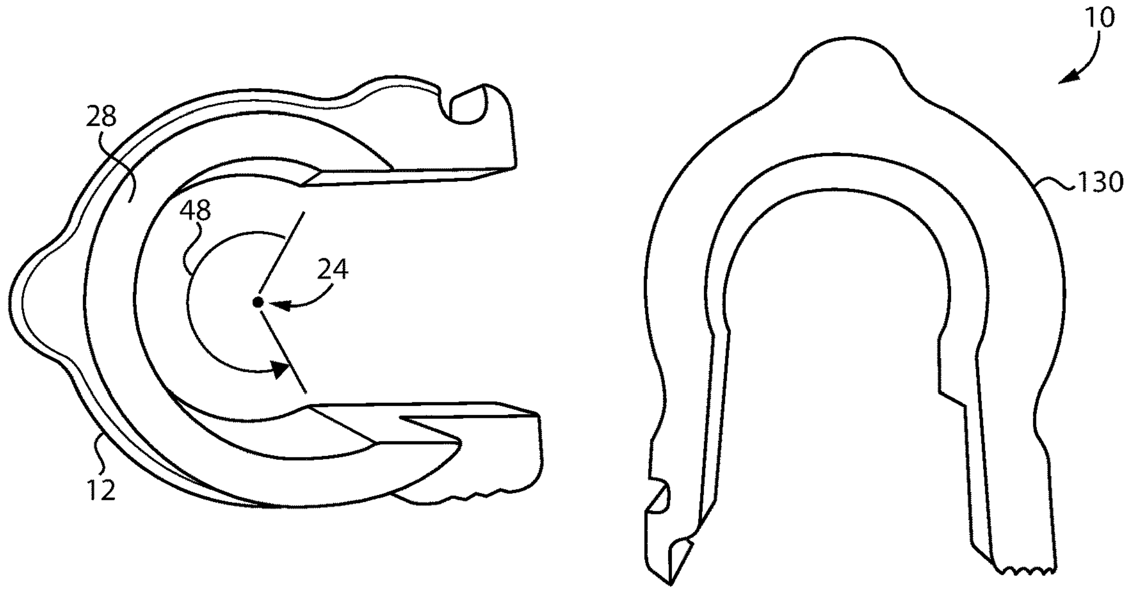
FIG. 2 is an elevational view of the disconnecting system of FIG. 1.

Focusing on FIG. 2, there it can be seen that first deformable clip 12 forms a C-shape between first finger tab 16 and second finger tab 18. First deformable clip 12 may also include a bump 36 projecting in a radially outward direction that is formed by outer surface 20. Bump 36 may be used for manipulating and placing first deformable clip 12 for service, and in some embodiments may be inclusive of a midpoint of the C-shape.

Figure 3:
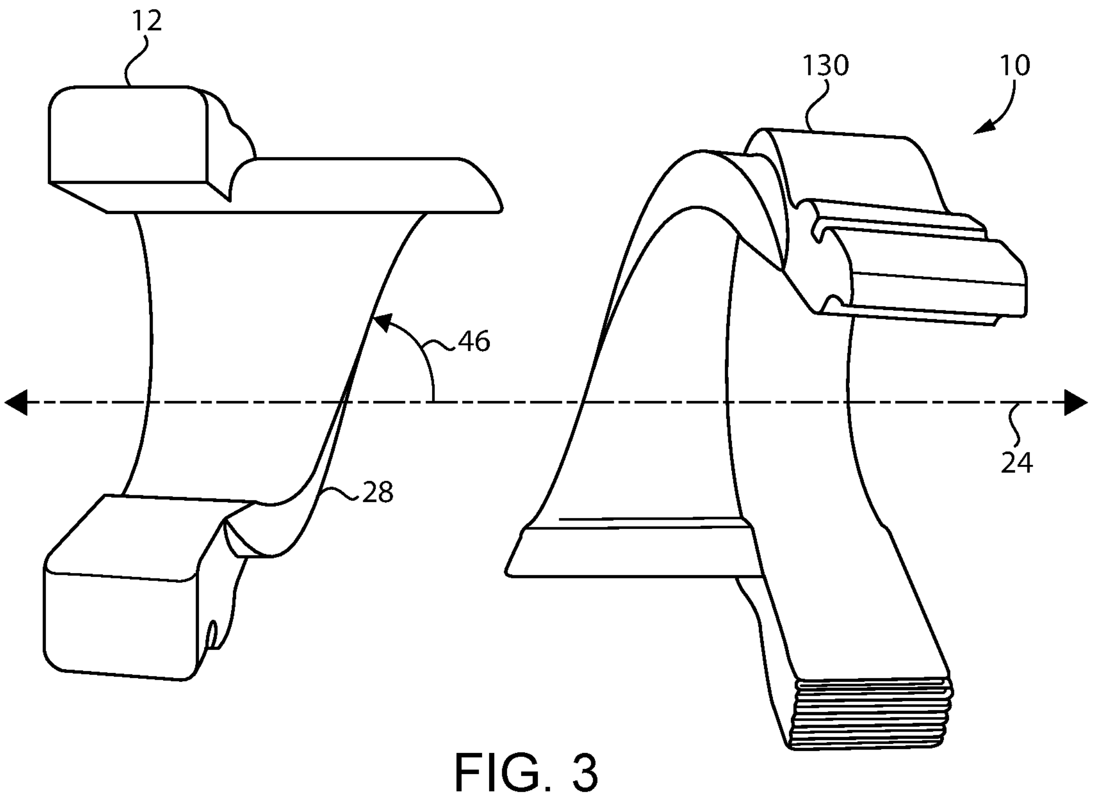
FIG. 3 is a side view of the disconnecting system as in FIGS. 1 and 2 shown in coaxial alignment.

Focusing on FIGS. 2 and 3, ramp surface 28 may be oriented at a ramp angle 46 to axis 24. Ramp angle 46 may or may not be equal around ramp surface 28, and embodiments are contemplated where ramp angle 46 becomes steeper or shallower progressing along ramp surface 28 towards a tip 44 identified in FIG. 1. Tip 44 may form an axially outermost point of first deformable clip 12. Ramp surface 28 may also define a circumferential angle 48 as identified in FIG. 2. Circumferential angle 48 around axis 24 may be greater than 180 degrees and less than 360 degrees.

At least one of first finger tab 16 and second finger tab 18 may include a gripping feature 38, 39, formed by outer surface 20. In an embodiment, gripping feature 38 upon first finger tab 16 may include a recess or the like. Gripping feature 39 upon second finger tab 18 may include ribs, knurling, surface texturing such as surface roughness relative to other parts of outer surface 20, another recess, or a variety of other gripping feature geometries, the significance of which will be further apparent from the following description.

As also identified in FIG. 1, first deformable clip 12 may include a base section 40 including first finger tab 16 and second finger tab 18. First deformable clip 12 may also include a projecting wall section 42 that includes ramp surface 28. First inside gripping surface 22 may be formed in part upon base section 40 and in part upon projecting wall section 42.

As discussed herein, first deformable clip 12 and second deformable clip 14 are "deformable." Clip body 14 may include a rest state, and a biased deformed state, assumed by a user squeezing first finger tab 16 and second finger tab 18 toward one another. Inside gripping surface 22 may define a cylinder or a cone in one of the rest state or the biased deformed state. Put differently, when first deformable clip 12 is being squeezed a cone or a cylinder may be defined by inside gripping surface 22. Analogously when first deformable clip 12 is not being squeezed a cone or cylinder may be defined by inside gripping surface 22. Although alternatives to this general configuration are contemplated, in one of the two states a cylinder or a cone shape is defined, assisting in gripping a fluid conduit as further discussed herein.

Figure 4:
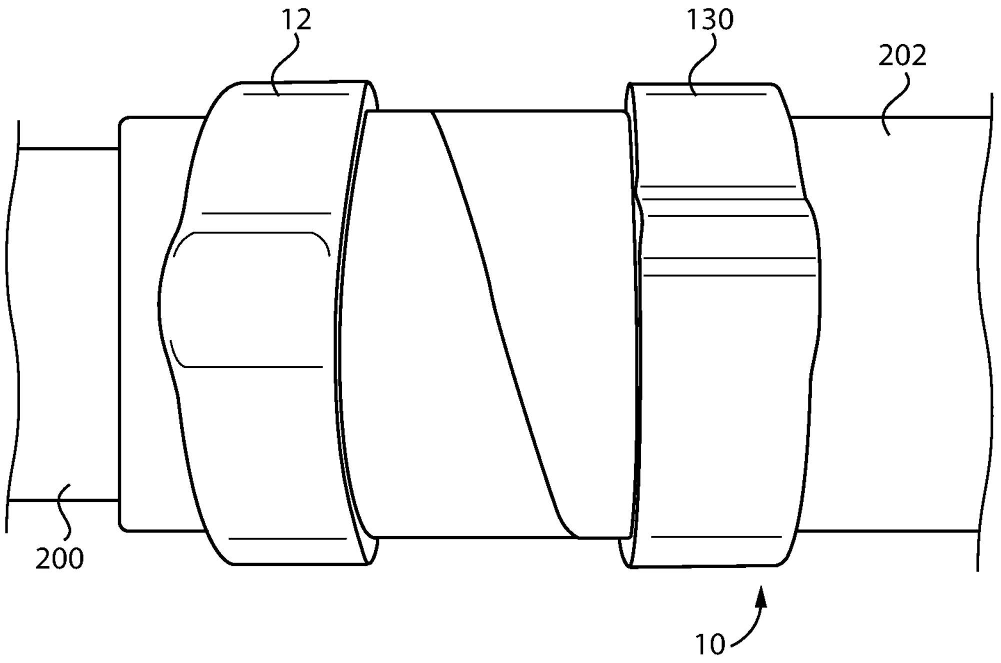
FIG. 4 is a side diagrammatic view of a disconnecting system as in FIGS. 1-3 shown in a service arrangement for disconnecting a fluid coupling.

Focusing now on FIG. 4, there is shown system 10 as it might appear where first deformable clip 12 and second deformable clip 14 have been positioned in a coaxial service arrangement adjacent to and abutting a first fluid conduit 200 and a second fluid conduit 202. In the illustrated case, first deformable clip 12 is positioned against first fluid conduit 200 and second deformable clip 130 is positioned around second fluid conduit 202. First deformable clip 12 and second deformable clip 130 may be spread by deformation to slip over the respective fluid conduits, although embodiments are contemplated where openings between the respective first and second finger tabs are sized sufficiently to receive the fluid conduit therein without deformation.

Figure 5:
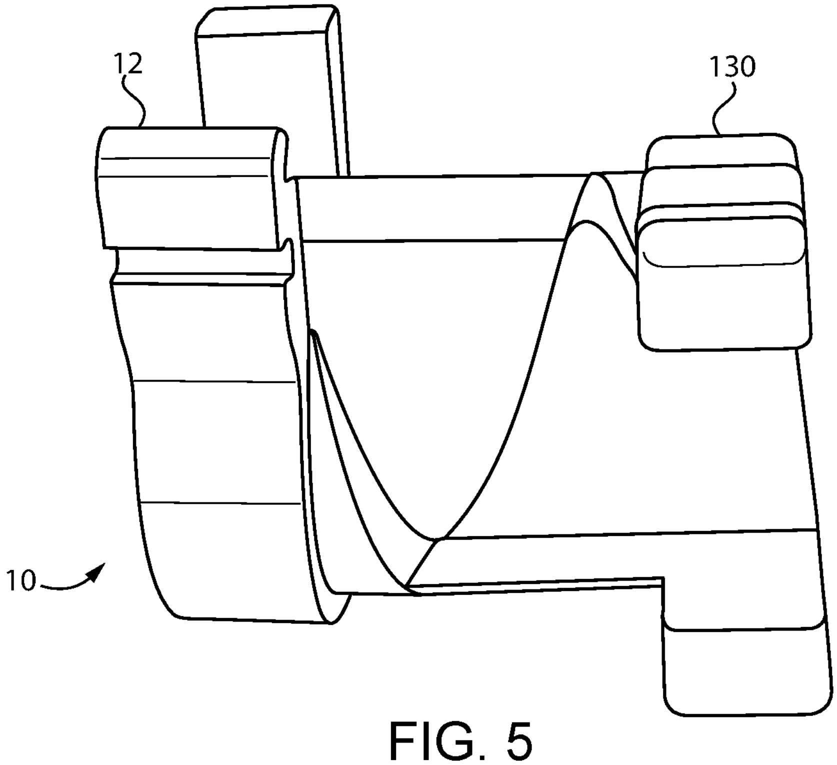
FIG. 5 is another side diagrammatic view of a disconnecting system as in FIGS. 1-4, wherein elements of the system are rotated relative to the arrangement of FIG. 4.

As depicted in FIG. 5, there is shown system 10 where first deformable clip 12 and second deformable clip 130 have been rotated relative to one another, as will be performed to reverse the fluid connection between fluid conduit 200 and fluid conduit 202.

Figure 6:
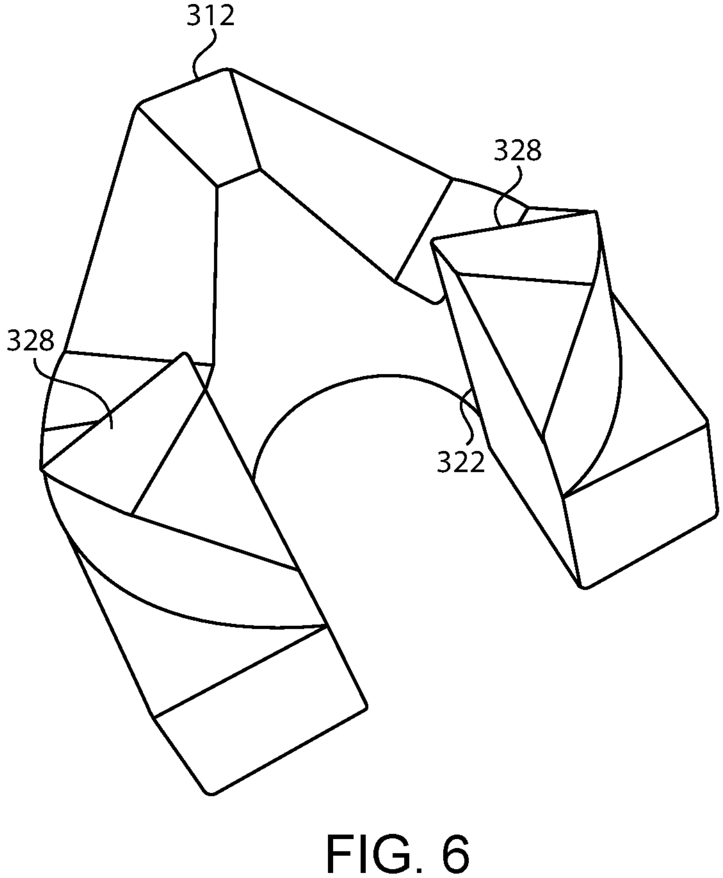
FIG. 6 is a diagrammatic view of a deformable clip for a disconnecting system for fluid couplings, according to another embodiment.

FIG. 6 illustrates another embodiment of a deformable clip 312 that may be constructed and used according to the present disclosure. Deformable clip 312 includes an inside gripping surface 322, and a plurality of ramp surfaces 328. Deformable clip 312 may be used generally analogously to that of other embodiments discussed and described herein, and merely illustrates alternative geometries. The present description of features and functionality of other embodiments will thus be understood to refer by way of analogy to deformable clip 312.

Figure 7:
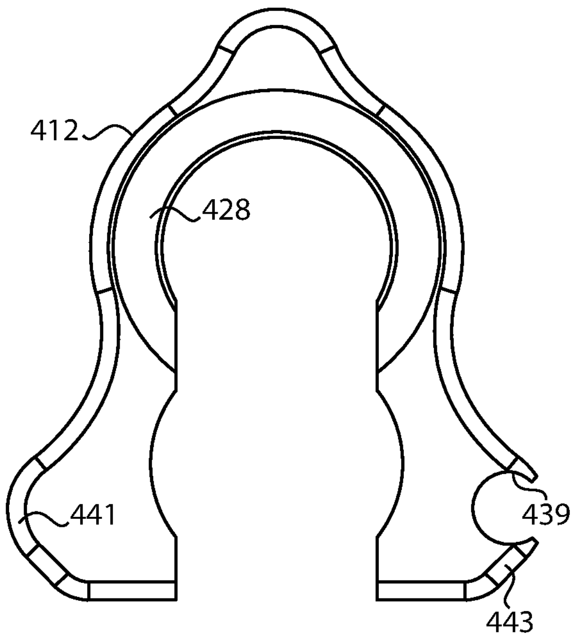
FIG. 7 is an elevational view of a deformable clip for a disconnecting system, according to yet another embodiment.
Figure 8:
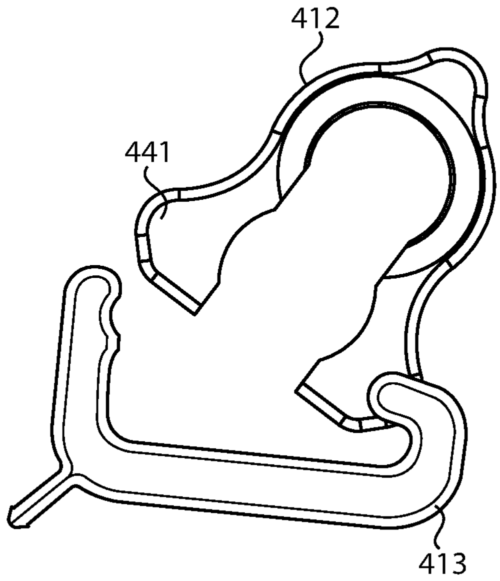
FIG. 8 is an elevational view of a deformable clip as in FIG. 7 in an assembly with a locking element.

FIG. 7 illustrates yet another embodiment of a deformable clip 412. Deformable clip 412 is again closely similar in various structural and functional ways to deformable clips discussed above, and reference can be made to that discussion by way of analogy in understanding deformable clip 412. Deformable clip 412 includes a ramp surface 428 that can interact with a counterpart element similar to the foregoing embodiments on a second deformable clip in a disconnecting system. Deformable clip 412 also includes a first lobe 441, and a second lobe 443 having a cutout 439 formed therein. Referring also to FIG. 8 there is shown a locking or clasping element 413 that can be engaged in cutout 439. Element 413 can be rotated to engage about lobe 441 to temporarily lock the assembly of deformable clip 412 and locking element 413 about and/or against a fluid conduit, fitting, etc., as discussed herein to free up the user's hands during use. For instance, a user could position the assembly of clip 412 and locking element 413 about an enhanced-strength connection, position a second clip, and then manipulate both clips as discussed herein to reverse the enhanced-strength connection.

Figure 9:
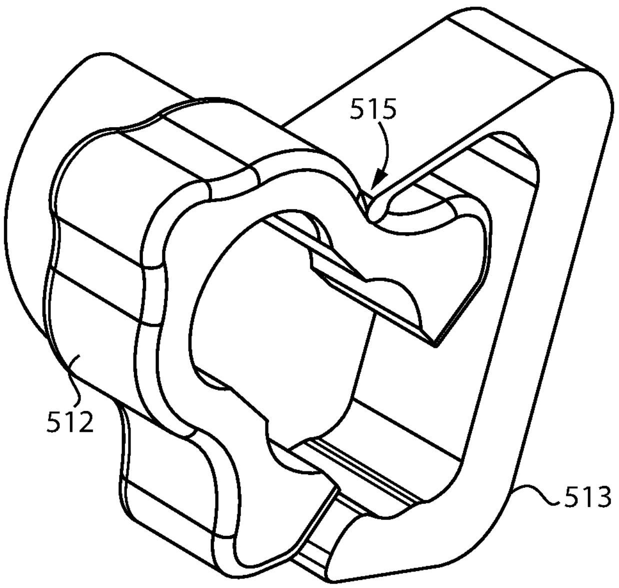
FIG. 9 is a diagrammatic view of a deformable clip and locking element assembly according to yet another embodiment.

FIG. 9 illustrates yet another embodiment, generally similar to the embodiment of FIGS. 7 and 8, including an assembly of a deformable clip 512 and a locking or clasping element 513. In contrast to the design of FIGS. 7 and 8, in the embodiment of FIG. 7 clip 512 and locking element 513 may be actually attached such as by way of a rotatable coupling 515.

INDUSTRIAL APPLICABILITY

Referring to the drawings generally, disconnecting a fluid coupling according to the present disclosure may include positioning a first clip adjacent to a first fluid conduit connected to a second fluid conduit, and deforming a second clip to grip the second fluid conduit with an inside gripping surface of the second clip. With reference to FIG. 4, first deformable clip 12 has been positioned adjacent to first fluid conduit 200, potentially abutting a fitting, a flange, or another structure thereof. Second deformable clip 130 has been deformed around second fluid conduit 202 to frictionally engage inside gripping surface 132 with second fluid conduit 202.

With the components arranged approximately as depicted in FIG. 4, second deformable clip 130 can be rotated while first deformable clip 12 remains stationary, causing ramp surface 28 of first deformable clip 12 to bear against drive surface 134 of second deformable clip 130. Bearing of ramp surface 28 against drive surface 134 during relative rotation causes translation of inside gripping surface 132 of second deformable clip 130 relative to first deformable clip 12, pulling second fluid conduit 202 generally in an axial direction away from first fluid conduit 200, and reversing the enhanced strength fitting between the two. Eventually, second fluid conduit 202 is withdrawn from first fluid conduit 200 based on the translating of inside gripping surface 132 relative to first deformable clip 12.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A disconnecting system for fluid couplings comprising:

a first deformable clip including a first finger tab, a second finger tab, an outer surface, an arcuate inside gripping surface extending around an axis between the first finger tab and the second finger tab, an axial end surface facing a first axial direction, and a ramp surface opposite to the axial end surface;

the ramp surface advancing in a second axial direction and in a circumferential direction around the axis between the first finger tab and the second finger tab, and the ramp surface forming a partially helical portion; and a second deformable clip including a second inside gripping surface, and a drive surface forming a partially helical portion rising in an axial direction inverse to the ramp surface shaped for facing contact against the first ramp surface in a coaxial service arrangement of the first deformable clip and the second deformable clip.

2. The disconnecting system of claim 1 wherein the ramp surface includes a half helical shape.

3. The disconnecting system of claim 2 wherein the ramp surface, together with the drive surface, form a helical shape.

4. The disconnecting system of claim 1 wherein the first deformable clip and the second deformable clip are substantially identical.

5. The disconnecting system of claim 1 wherein the first deformable clip forms a C-shape between the first finger tab and the second finger tab.

6. The disconnecting system of claim 5 wherein the first deformable clip includes a bump formed by the outer surface inclusive of a midpoint of the C-shape.

7. The disconnecting system of claim 1 wherein at least one of the first finger tab or the second finger tab includes a gripping feature formed by the outer surface.

8. The disconnecting system of claim 1 wherein the first deformable clip includes a base section including the first finger tab and the second finger tab, and a projecting wall section including the ramp surface, and wherein the first inside gripping surface is formed in part upon the base section and in part upon the projecting wall section.

9. A deformable clip for a disconnecting system for fluid couplings comprising:

a clip body including a first finger tab, a second finger tab, an outer surface, an arcuate inside gripping surface extending around an axis between the first finger tab and the second finger tab, an axial end surface facing a first axial direction, and a ramp surface; and the ramp surface extending in a second axial direction toward a tip forming an axially outermost point of the clip body, and oriented at a ramp angle to the axis, and defining a circumferential angle around the axis that is greater than 180 degrees and less than 360 degrees.

10. The deformable clip of claim 9 wherein the ramp surface traverses a generally helical path about and around the axis toward the tip.

11. The deformable clip of claim 9 wherein the clip body includes a one-piece non-metallic body.

12. The deformable clip of claim 11 wherein the one-piece non-metallic body forms a C-shape, and the first finger tab and the second finger tab project from tips of the C-shape.

13. The deformable clip of claim 9 wherein the clip body includes a base section, and a projecting wall section that includes the ramp surface.

14. The deformable clip of claim 13 wherein the inside gripping surface is formed in part upon the base section and in part upon the projecting wall section.

15. The deformable clip of claim 9 wherein the clip body includes a rest state, and a biased deformed state, and the inside gripping surface defines a cylinder or a cone in the rest state or the biased deformed state.

16. The deformable clip of claim 9 wherein at least one of the first finger tab or the second finger tab includes a gripping feature.

17. The deformable clip of claim 16 wherein the gripping feature is formed by the outer surface.

18. The deformable clip of claim 10 wherein the ramp surface includes a half helical shape.

19. The deformable clip of claim 18 wherein the ramp surface is continuously helical about and around the axis toward the tip.

* * * * *